United States Patent [19]

Mos et al.

[11] Patent Number: 5,105,530
[45] Date of Patent: Apr. 21, 1992

[54] METHOD OF FORMING HIGH CHANNEL DENSITY MAGNETIC HEAD

[76] Inventors: Robert J. Mos, 818 San Gabriel Pl.; Robert J. Mos, 808 San Luis Rey Pl., both of San Diego, Calif. 92109

[21] Appl. No.: 509,515

[22] Filed: Apr. 13, 1990

[51] Int. Cl.$^5$ .............................................. G11B 5/42
[52] U.S. Cl. ........................................ 29/603; 29/760
[58] Field of Search .................... 29/603, 738, 760; 360/125–127, 129

[56] References Cited

U.S. PATENT DOCUMENTS

| | | | |
|---|---|---|---|
| 3,064,333 | 11/1962 | Kristiansen et al. | 29/603 X |
| 3,217,389 | 11/1965 | Neumann et al. | 29/603 |
| 3,400,386 | 9/1968 | Sinnott | 29/603 |
| 4,346,418 | 8/1982 | Cullum et al. | 29/603 X |
| 4,594,772 | 6/1986 | Bucher | 29/603 |

*Primary Examiner*—Carl E. Hall
*Attorney, Agent, or Firm*—Baker, Maxham, Jester & Meador

[57] ABSTRACT

A high channel density magnetic head includes a housing made from non-magnetic material having a plurality of grooves formed therein, a plurality of shield assemblies mounted in the grooves, and a plurality of magnetic core elements arranged between the shield assemblies outside the grooves. The magnetic core elements are positioned using a pair of close tolerance tools having grooves and slots formed therein to receive and positionally restrain the magnetic core elements during assembly.

17 Claims, 3 Drawing Sheets

METHOD OF FORMING HIGH CHANNEL DENSITY MAGNETIC HEAD

BACKGROUND OF THE INVENTION

The field of the present invention is the storage and retrieval of magnetically encoded information, and more particularly the asynchronous storage and retrieval of magnetic information on one or more tracks on a streaming magnetic medium using a magnetic head having one or more information channels, and still more particularly, the storage and retrieval of magnetic information on a plurality of high density tracks on a magnetic tape using a high channel density magnetic head.

Magnetic recording of analog or digital information on magnetic media such as tape is known. Generally, a magnetic head is used to magnetically encode and retrieve information on the tape medium on one or more tracks, with each track requiring a separate magnetic core element in the magnetic head. Conventionally used track densities include from 1 to 60 tracks on a single tape.

In those applications requiring relatively few data tracks, conventional head fabrication methods have proven satisfactory. Some applications, however, require a relatively greater number of tracks. For example, in voice or data logging applications, such as the recording of multiple incoming telephone calls to 911 emergency numbers, there may be numerous simultaneous incoming calls to be simultaneously recorded. Preferably, all of these incoming calls would be recorded on separate tracks on a standard 0.15", 0.25", 0.5" or 1" recording tape used for such applications.

In multi-track magnetic recorders of this type, the mechanical limitations of placing the magnetic cores in a magnetic head in close proximity have made the manufacturing of this type of head extremely difficult and expensive. In addition, where this type of head is used in voice logging at very low tape speeds, a high number of coil winding turns is required, therefore occupying even more space between the closely located tracks. Accordingly, an evident need exists for a high channel density magnetic head and method of constructing therefor which would facilitate high density magnetic recording.

SUMMARY OF THE INVENTION

The present invention is directed to a high channel density magnetic head and method of construction therefor which may be satisfactorily employed to record a large number of tracks per inch. To that end, a magnetic core of unique design enables placement of multiple magnetic cores in very close proximity to one another. There is also provided a first novel tool for positioning the magnetic cores during manufacturing of the magnetic head at a very close pitch tolerance, as well as a second novel tool for maintaining the back gap of the core in relation to the front gap. In this manner, the assembly of high channel density magnetic heads can be performed with ease and high yield.

DETAILED DESCRIPTION OF PREFERRED EMBODIMENTS

Figure 1:
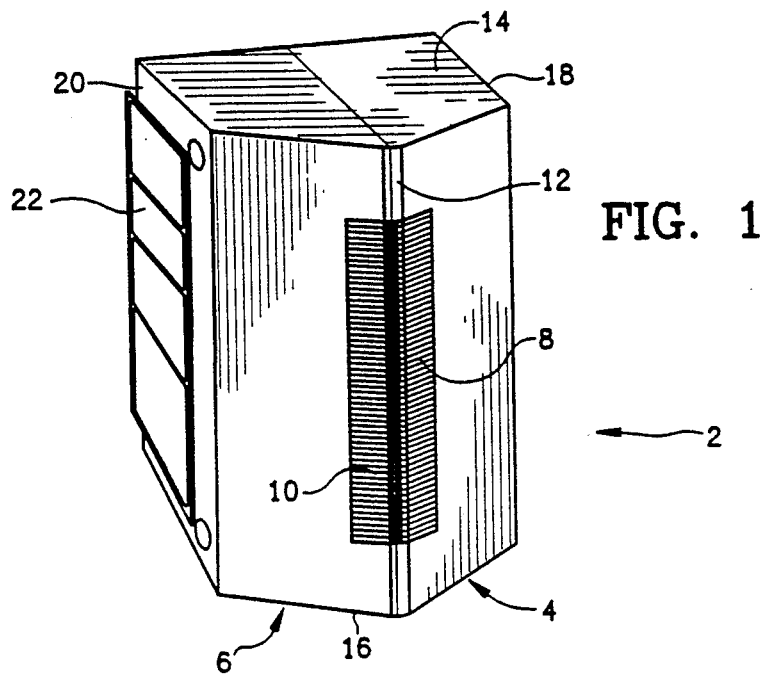
FIG. 1 is an external perspective view of a completed magnetic head constructed in accordance with the present invention.

Referring now to FIG. 1, a magnetic head 2 includes a first housing 4 and a second housing 6 joined together at the respective inner faces thereof to form the complete magnetic head 2. The housings 4 and 6, which may be conveniently machined from brass stock or other non-magnetic material, include a plurality of sequential magnetic tracks 8 and 10, respectively, extending a length sufficient to encompass the width of the recorded field on an associated magnetic tape. The tracks 8 and 10 of the housings 4 and 6 are aligned with one another such that the respective tracks of each housing combine to form a single magnetic circuit of the flux path field. Between each of the tracks 8 and 10 is a space equal width to the track. In practice, an adjacent pair of magnetic heads 2 would be provided with the heads offset by one track to double the effective track density which would be provided if a single head 2 was used alone. The magnetic head 2 generally includes a front recording face 12, a top 14, a bottom 16 and sides 18 and 20, respectively. A label 22 is mounted on the side 20 to provide information regarding the operational characteristics of the magnetic head 2.

Figure 2:
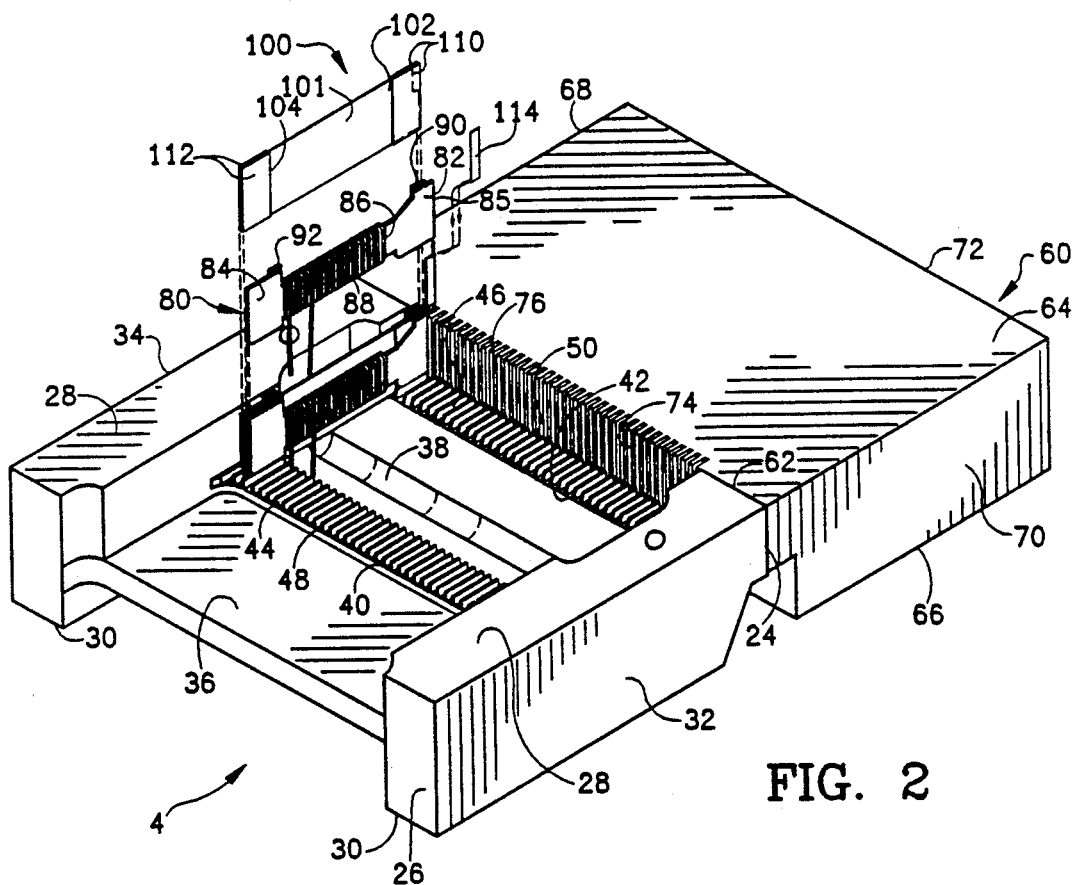
FIG. 2 is an exploded perspective view of one of the two magnetic housings forming the magnetic head of FIG. 1 showing the sequential placement of magnetic core elements and a core pitch alignment tool used to precisely control magnetic core positioning and pitch.

Turning now to FIG. 2, the housing 4 includes a head area 24, a base 26, a generally planar inner face 28, a generally planar outer face 30, and a pair of side members 32 and 34 extending between the head area 24 and the base 26. The housing 4 further includes an intermediate web 36 having a slot 38 formed therein. Also extending between the sides 32 and 34 are a pair of bridge elements 40 and 42 having formed therein a plurality of grooves or slots 44 and 46, respectively. The grooves 44, 46 extend generally parallel to the side members 32 and 34, and perpendicular to the head area 24 and the base 26 of the housing 4. The grooves 44, 46 are formed by a plurality of parallel truncated fin elements 48, 50. The grooves 44, 46 are thus generally U-shaped, having a substantially planar base formed by the bridge elements 40, 42, and a pair of planar parallel side walls formed by the truncated fin elements 48, 50.

Still referring to FIG. 2, the housing 4 is mounted in registration position with respect to a core pitch alignment tool 60 having a generally planar tool face 62 abutting the head area 24 of the housing 4. The core pitch alignment tool 60 further includes a generally planar top surface 64 which is co-planar with the inner face 28 of the housing 4. The core pitch alignment tool 60 also includes a bottom surface 66 which is parallel to the top surface 64. The top and bottom surfaces 64, 66 of the core pitch alignment tool 60 extend between parallel sidewalls 68 and 70, respectively, sidewall 68 being co-planar with the side members 34, and sidewall 70 being co-planar with the side member 32, of the housing 4. Spaced rearwardly of the tool face 62 and extending generally parallel thereto is a rear face 72.

The tool face 62 has formed thereon a plurality of tool grooves or slots 74 extending substantially parallel to the sidewalls 68 and 70, and substantially perpendicular to the top and bottom surfaces 64 and 66. The tool grooves 74 are formed by a plurality of truncated fin elements 76. Like the housing grooves 44 and 46, the tool grooves 74 are generally U-shaped, having a substantially planar base and a pair of substantially planar sidewalls. The core pitch alignment tool 60 is a high precision tool may be formed from hardened steel or like material. The grooves 74 therein are formed by precision machining methods such as conventionally known Electrode Discharge Machining (EDM) or laser cutting. The grooves 74 are formed along the tool face 62 at a predetermined distance from a datum such that tolerance buildup is avoided and groove position closely controlled. Each of the grooves 74 is thus defined by a first datum surface 75, see FIG. 4, formed at a predetermined distance from the datum, and a second offset surface.

With the housing 4 and the tool 60 positioned as shown in FIG. 2, the magnetic core assemblies may be sequentially built up There is shown a plurality of magnetic core assemblies 80 made from a suitable magnetic material having a front core element 82 extending toward the head area 24 of the housing 4, a back core element 84 extending toward the base 26 of the housing 4 and a central winding support area 86 extending between the front and back core elements 82 and 84. Disposed on the magnetic core assembly, forwardly of the front core element 82 is a removable longitudinal alignment tab 85. The winding area 86 has wound thereon an electrically conductive filament 88 which is adapted to be connected to an external electrical circuit. The magnetic core assemblies 80 further include a removable forward transverse alignment tab 90 and a removable rearward transverse alignment tab 92 extending from the inner face 28 of the magnetic housing 4. As shown in FIG. 2, the magnetic core assemblies 80 have a thin pitch dimension extending in the direction between the side members 32 and 34 of the magnetic housing 4 in order to minimize the distance between successive core elements. Typically, the winding support area 86 would have a thin pitch dimension thickness of about 0.004" minimum and the entire assembly a thin dimension thickness of about 0.006" minimum.

Positioned between each of the core assemblies 80 is a shield assembly 100. The shield assembly 100 extends generally parallel to the side members 32 and 34 of the housing 4 and includes a magnetic shield 101 made from a suitable magnetic material, having a forward end 102 extending toward the head area 24 of the housing 4, and a rearward end 104 extending toward the base 26 of the magnetic housing 4. The shield assembly 100 also has a thin dimension extending between the side members 32 and 34 of the housing 4 in order to minimize magnetic core spacing. Typically, the magnetic shield 101 would have a thickness of about 0.004". Mounted at the ends 102 and 104 of the shield assembly 100 are a pair of non-magnetic spacer elements 110 and 112, respectively. Typically, the spacer elements 110, 112 would have a thickness of about 0.002-0.004". The spacer elements 110, 112 are formed on each side of the magnetic shield 101 such that the ends of the magnetic shield 101 are sandwiched therebetween to complete the shield assembly 100.

Figure 4:
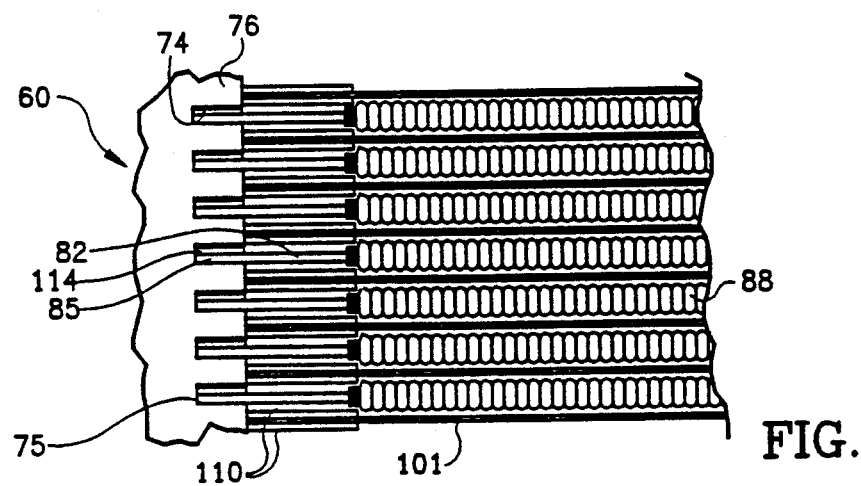
FIG. 4 is a partial detailed plan view of the magnetic housing of FIGS. 2 and 3 showing the arrangement of multiple magnetic core elements in relation to the core pitch alignment tool.

Referring now to FIGS. 2 and 4, it will be seen that the magnetic core assemblies 80 are positioned with the longitudinal alignment tabs 85 thereof in the tool grooves 74 abutting the datum surface 75 thereof. One or more shims 114 may then be placed as needed adjacent the tab 85 until the tab is securely positioned in the core pitch alignment tool groove 74. For example, the tool groove 74 may be 0.011" and the tab 85 0.010", in which case a single 0.001" shim could be used. The magnetic core assembly 82 extends from the core pitch alignment tool 60, and rests on top of the housing fin elements 48, 50 which provide a core support surface. The foregoing placement of each magnetic core assembly 80 is followed by the placement of a shield assembly 100 in the housing grooves 40 and 42, with the forward end 102 thereof flush against the tool face 62, between the tool grooves 74. This sequence is repeated until a desired number of magnetic core assemblies is placed in the housing 4.

Figure 3:
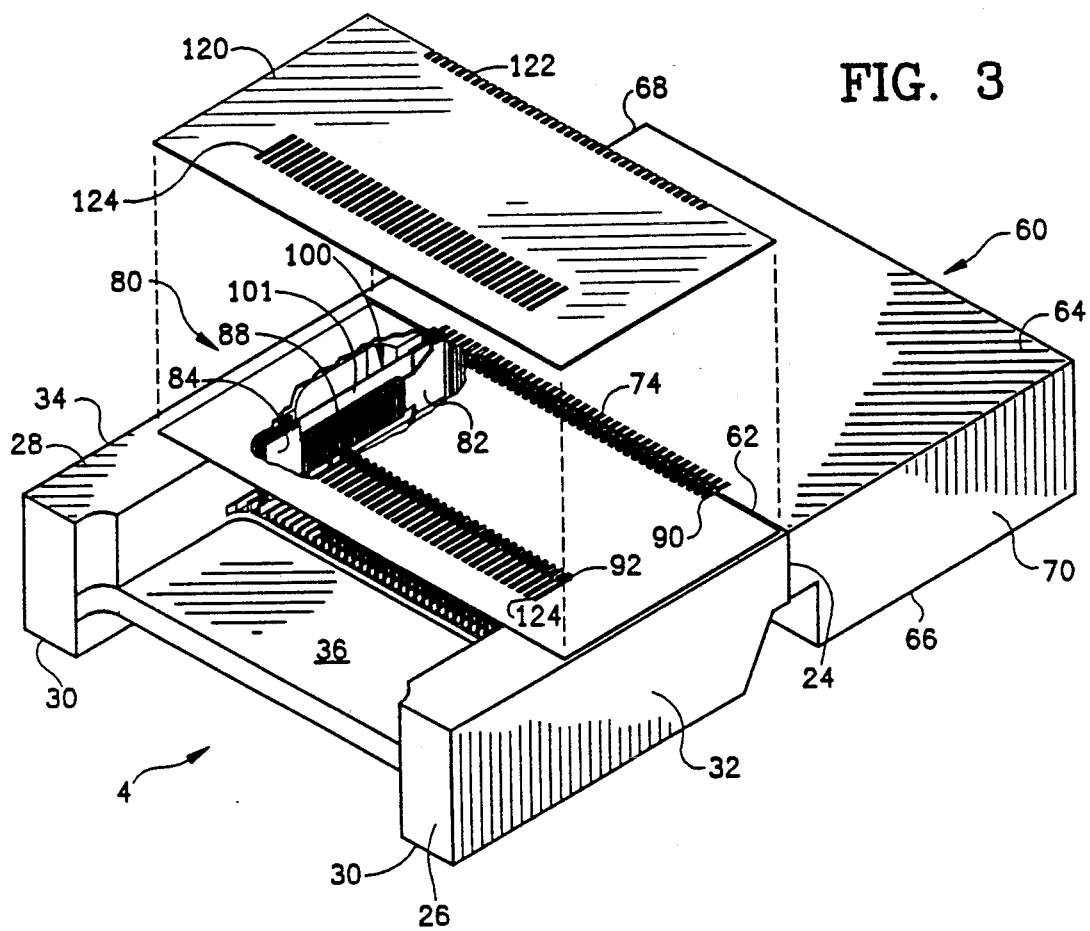
FIG. 3 is a perspective view of the magnetic housing of FIG. 2 showing a back gap alignment tool in both spaced and assembled positions with a portion thereof broken away for clarity to show the placement of magnetic cores thereunder.

Referring now to FIG. 3, the back gap of the magnetic core assemblies 80 is controlled using a back gap alignment tool 120. The back gap alignment tool 120 is a generally planar sheet element preferably formed from hardened steel or like material having a plurality of forward registration alignment grooves 122 positioned to opposingly register with the tool grooves 74. The forward registration grooves are sized and positioned to receive the forward transverse alignment tabs 90 of the magnetic core assembly 80 therein. The back gap alignment tool 120 further includes a plurality of back gap alignment slots 124 which are sized and positioned to receive the rearward transverse tabs 92 of the core assemblies 80. The back gap alignment slots 124 are positionally aligned with the forward registration grooves 122 and the tool grooves 74 of the core pitch alignment tool 60. Like the tool grooves 74, the forward registration grooves 122 and the back gap alignment slots 124 include a datum surface and an offset surface formed at a predetermined distance from a datum using precision EDM, laser cutting or chemical etching techniques. With the gap alignment tool 120 placed over the respective tabs 90 and 92 of the core assemblies 80, the core and shield assemblies are cemented to the housing and each other. The gap alignment tool 120 is then removed and the housing assembly is encapsulated with epoxy, or other suitable resinous material, and cured to harden the compound. After curing, the core pitch alignment tool 60 is removed. The longitudinal alignment tabs 85, the shims 114, and the transverse alignment tabs 90 and 92 are then removed by grinding, lapping or milling.

Figure 5:
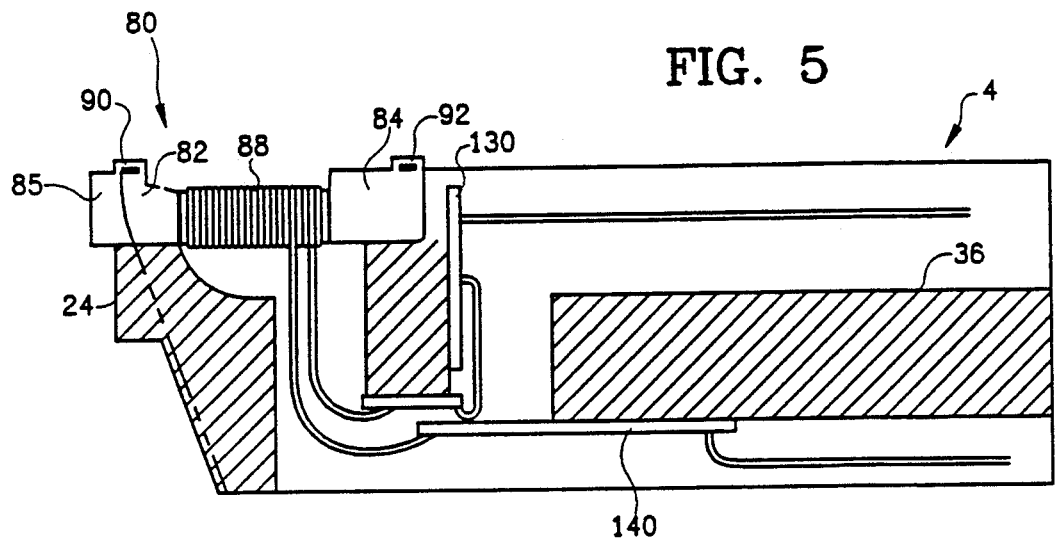
FIG. 5 is a cross-sectional view of the magnetic housing of FIGS. 2 and 3 illustrating a single magnetic core and its attachment to a pair of connector boards.
Figure 6:
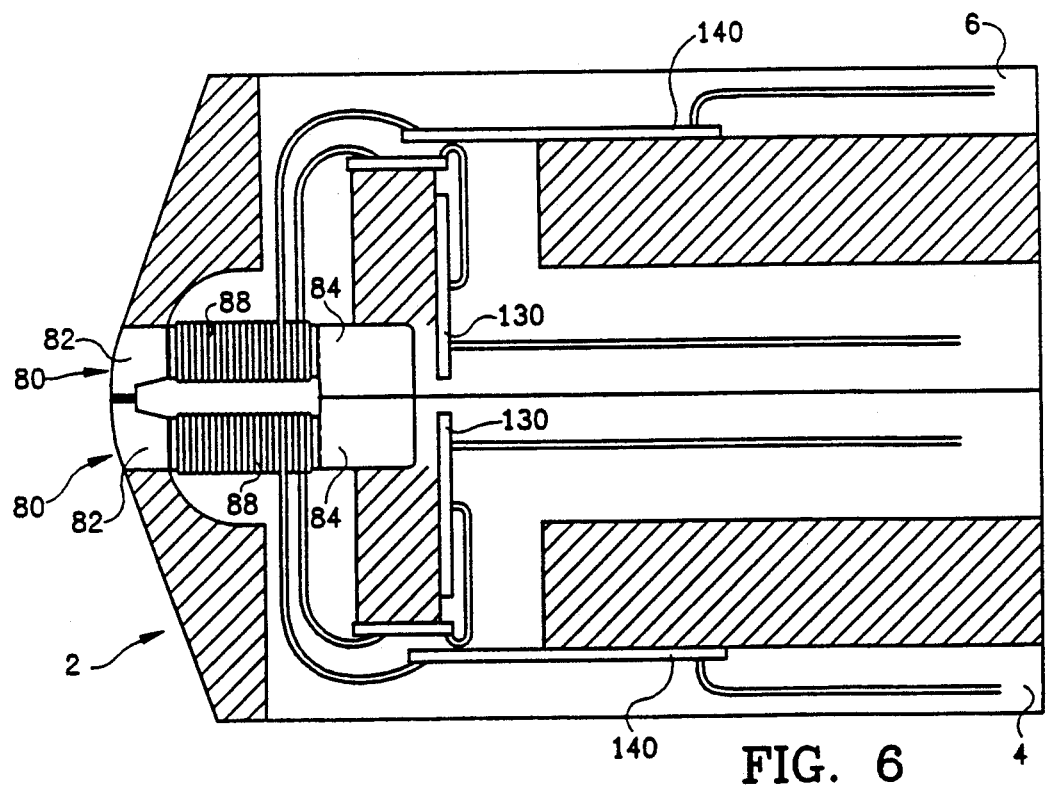
FIG. 6 is a cross-sectional view of the magnetic head of FIG. 1 comprised of a set of magnetic core elements on respective pairs of magnetic housings joined at the respective inner faces thereof.

Referring now to FIGS. 5 and 6, the leads from the magnetic core filaments are attached to appropriate connector boards 130 and 140 for attachment to associated electrical circuit components. The housings 4 and 6 are then mounted to one another at their respective inner faces with a non-magnetic space 150 disposed partially therebetween as conventionally known, to form the magnetic head 2. Grinding, lapping or milling and further finishing of the magnetic head may be performed in accordance with conventional techniques used in the magnetic head manufacturing environment.

With the foregoing magnetic head structure and construction method therefor, magnetic core pitch and associated pitch tolerances can be greatly reduced. Thus, magnetic core pitch may be in a range of about 0.015" to 0.060" with a 0.015" pitch providing a 128 track/inch track density. The magnetic core pitch tolerance is greatly improved with the magnetic core pitch not varying more than about 0.0005 inches.

Thus, a high channel density magnetic head and method of construction therefor has been disclosed. While applications and embodiments have been shown and described, it should be apparent to those skilled in the art that many more modifications are possible without departing from the inventive concepts herein. The invention is therefore not to be restricted except in the spirit of the appended claims.

We claim:

1. A method for forming a magnetic head comprising the steps of:
    installing a magnetic core and a magnetic shield on a housing using a removable tool, said tool having means for fixedly positioning the magnetic core with respect to the housing, said means for fixedly positioning including a plurality of alignment slots each having a datum surface and an offset surface, said datum surfaces being formed at predetermined distances from a datum;
    said installing step including:
    positioning said tool in a predetermined relationship with said housing;
    placing a magnetic core in the housing with a portion thereof against one of said datum surfaces;
    installing a magnetic shield adjacent the magnetic core so placed; and
    permanently attaching the magnetic core and shield in position on the housing and removing the tool when a desired number of magnetic cores and shields have been installed.

2. The method of claim 1 wherein the magnetic cores are provided with removable tabs that insert into said slots.

3. The method of claim 1 further including the step of fixedly positioning the magnetic cores using a second tool having one or more slots into which another portion of the magnetic core is inserted.

4. The method of claim 3 wherein the magnetic cores are provided with removable tabs that insert into the slots in said second tool.

5. The method of claim 3 wherein the magnetic cores include a pair of tabs that insert into the slots in said second tool.

6. The method of claim 1 wherein a plurality of magnetic cores having a longitudinal dimension, a transverse dimension and a thin pitch dimension are fixedly positioned on a housing using a removable tool positioned at one of the longitudinal ends of the magnetic cores, said tool having a plurality of slots extending parallel to the transverse dimension of the magnetic cores and into which said one of the longitudinal ends of the magnetic cores is inserted to align the magnetic core in parallel spaced relation, and wherein the shields are positioned in truncated grooves in said housing.

7. The method of claim 1 wherein said magnetic cores are spaced at a predetermined pitch, said predetermined pitch not varying more than about 0.005 inches.

8. A method for forming a magnetic head comprising the steps of:
    temporarily mounting a housing to a tool including a tooling face, said tooling face having a plurality of close tolerance grooves formed therein, each of said grooves having a datum surface formed at a predetermined distance from a fixed datum point and an offset surface, said datum and offset surfaces being substantially parallel to each other and substantially perpendicular to said tooling face;
    said housing having a head area, a base, an inner face, an outer face, and a pair of sides extending between said base and head area, said head area being positioned adjacent to said tool, said housing further including a plurality of grooves extending generally perpendicularly from said tooling face between said tool grooves;
    said housing grooves having formed therebetween magnetic core support surfaces;
    sequentially mounting in said tool grooves and on top of said magnetic core support surfaces a plurality of magnetic cores, and mounting between said magnetic cores, in said housing grooves and between said tool grooves, a plurality of magnetic shields, said magnetic cores having a longitudinal tab positioned in said tool grooves, a front core element, a back core element and a central winding support area between said front core and back core elements, said central winding support area having wound thereon an electrically conductive filament;
    said magnetic shields having a forward end, and a rearward end proximate the head area and base of said housing, respectively, and a central portion extending between said forward and rearward end;
    said magnetic cores being placed in said tool grooves against the datum surface thereof and said magnetic cores being securely positioned in said tool grooves using one or more shims as necessary between said magnetic cores and the tool groove offset surface; and
    said magnetic shields being placed in said housing grooves with the forward end rearward ends thereof positioned between respective pairs of spacer members of predetermined thickness;
    securing said magnetic cores and magnetic shields between the side portions of said housing using an epoxy potting compound; and
    removing said housing from said tool.

9. The method of claim 7 wherein said alignment tool has two sets of sequential slots for the respective transverse tabs on said magnetic core head and base elements.

10. A method for forming a magnetic head comprising the steps of sequentially:
    installing a magnetic core on a housing using a removable tool having means to fixedly position the magnetic core with respect to the housing;
    installing a magnetic shield adjacent the magnetic core; and
    permanently attaching the magnetic core and shield in position on the housing and removing the tool when a desired number of magnetic cores and shields has been installed; and further wherein
    the magnetic core includes a plurality of magnetic cores having a longitudinal dimension, a transverse dimension and a thin pitch dimension, which cores are fixedly positioned on the housing using the removable tool positioned at one of the longitudinal ends of the magnetic cores, said tool having a plurality of slots extending parallel to the transverse dimension of the magnetic cores and into which said one of the longitudinal ends of the magnetic cores is inserted to align the magnetic cores in parallel spaced relation, and wherein the shields are positioned in truncated grooves in said housing; and further wherein said tool includes a datum surface formed at a predetermined distance from a datum, against which the magnetic cores are positioned, and an offset surface, the magnetic cores being fixedly positioned against the datum surface using one or more shims as necessary.

11. A method for forming a magnetic head comprising the steps of sequentially:

installing a magnetic core on a housing using a removable tool having means to fixedly position the magnetic core with respect to the housing;

installing a magnetic shield adjacent the magnetic core; and permanently attaching the magnetic core and shield in position on the housing and removing the tool when a desired number of magnetic cores and shields has been installed; and further wherein the magnetic core includes a plurality of magnetic cores having a longitudinal dimension, a transverse dimension and a thin pitch dimension, which cores are fixedly positioned on the housing using the removable tool positioned at one of the longitudinal ends of the magnetic cores, said tool having a plurality of slots extending parallel to the transverse dimension of the magnetic cores and into which said one of the longitudinal ends of the magnetic cores is inserted to align the magnetic cores in parallel spaced relation, and wherein the shields are positioned in truncated grooves in said housing; and further wherein said tool includes a datum surface formed at a predetermined distance from a datum, against which the magnetic cores are positioned, and an offset surface, the magnetic cores being fixedly positioned against the datum surface using one or more shims as necessary; and further wherein said magnetic core members have a pair of transverse tabs formed on head and base elements thereof extending from an interface portion of said housing, and wherein said method further includes the step of mounting a back gap alignment tool over said interface of said housing, said back gap alignment tool having a set of sequential slots exposed therein at a predetermined pitch, said slots being placed over at a predetermined pitch, said slots being placed over magnetic core transverse tabs to further align the back gap of said magnetic cores.

12. A method for forming a magnetic head comprising the steps of:

mounting a magnetic head housing in registration with a core pitch alignment tool, said tool having a plurality of alignment slots formed therein, said alignment slots each including a datum surface formed at a predetermined distance from a datum, and an offset surface;

installing a plurality of magnetic cores and a magnetic shield on said magnetic housing, said installing step including:

installing a plurality of magnetic cores on said magnetic housing and inserting a portion of said cores in said core pitch alignment tool slots against said datum surfaces;

installing magnetic shields adjacent said magnetic cores so inserted;

permanently attaching said magnetic cores and shields in position on said magnetic head housing to form a head assembly and removing said alignment tool; and joining said magnetic head assembly with said magnetic cores and shields attached thereto with a matching assembly to form a complete magnetic head.

13. The method of claim 12 wherein said alignment tool engages a forward end portion of each magnetic core, and wherein a second back gap alignment tool is placed in registration with a rearward portion of each magnetic core prior to permanently attaching said magnetic cores to said magnetic head housing.

14. The method of claim 12 wherein said alignment tool slots are formed to eliminate tolerance build up.

15. The method of claim 12 wherein said magnetic cores and shields are attached to said magnetic head housing by encapsulating said housing with a resinous compound and curing to harden the compound.

16. The method of claim 12 wherein said magnetic shields are half-shields and are positioned below said magnetic cores in said magnetic head housing.

17. The method of claim 16 wherein said magnetic shields include a notch formed in an end portion thereof.

* * * * *

UNITED STATES PATENT AND TRADEMARK OFFICE
CERTIFICATE OF CORRECTION

PATENT NO.  : 5,105,530
DATED       : April 21, 1992
INVENTOR(S) : Robert J. Mos et al It is certified that error appears in the above-identified patent and that said Letters Patent is hereby corrected as shown below:

At column 3, line 31, insert --.-- after "up".

In claim 9, line 1, change "7" to --8--.

Signed and Sealed this

Eighth Day of June, 1993

Attest:

MICHAEL K. KIRK

Attesting Officer

Acting Commissioner of Patents and Trademarks